United States Patent
Nishita

(10) Patent No.: US 9,201,741 B2
(45) Date of Patent: Dec. 1, 2015

(54) STORAGE DEVICE, ERROR PROCESSING METHOD, AND COMMUNICATION SYSTEM

(71) Applicant: FUJITSU LIMITED, Kawasaki-shi, Kanagawa (JP)

(72) Inventor: Satoru Nishita, Kahoku (JP)

(73) Assignee: FUJITSU LIMITED, Kawasaki (JP)

( * ) Notice: Subject to any disclaimer, the term of this patent is extended or adjusted under 35 U.S.C. 154(b) by 161 days.

(21) Appl. No.: 14/063,524

(22) Filed: Oct. 25, 2013

(65) Prior Publication Data

US 2014/0173364 A1    Jun. 19, 2014

(30) Foreign Application Priority Data

Dec. 13, 2012 (JP) ................................ 2012-272632

(51) Int. Cl.
G06F 11/00 (2006.01)
G06F 11/16 (2006.01)
G06F 11/20 (2006.01)

(52) U.S. Cl.
CPC ........ *G06F 11/1625* (2013.01); *G06F 11/2002* (2013.01)

(58) Field of Classification Search
CPC .............. G06F 11/2002; G06F 11/201; G06F 11/2005; G06F 11/1625
See application file for complete search history.

(56) References Cited

U.S. PATENT DOCUMENTS

| 7,836,352 | B2 * | 11/2010 | Sharma et al. | 714/44 |
| 8,812,913 | B2 * | 8/2014 | Colline | 714/47.2 |
| 2003/0021227 | A1 * | 1/2003 | Lee et al. | 370/228 |
| 2003/0126347 | A1 * | 7/2003 | Tan et al. | 710/313 |
| 2005/0080895 | A1 * | 4/2005 | Cook et al. | 709/224 |
| 2009/0077275 | A1 * | 3/2009 | Zhang | 710/38 |
| 2009/0094401 | A1 | 4/2009 | Larson et al. | |
| 2010/0080117 | A1 * | 4/2010 | Coronado et al. | 370/217 |
| 2010/0083040 | A1 * | 4/2010 | Voigt et al. | 714/7 |
| 2010/0083061 | A1 * | 4/2010 | Coronado et al. | 714/708 |
| 2011/0191637 | A1 * | 8/2011 | Wight et al. | 714/43 |
| 2011/0191644 | A1 * | 8/2011 | Oldfield et al. | 714/704 |
| 2013/0080821 | A1 * | 3/2013 | Compton et al. | 714/3 |

FOREIGN PATENT DOCUMENTS

| JP | 2001-217896 | 8/2001 |
| JP | 2007-312095 | 11/2007 |
| JP | 2009-93636 | 4/2009 |

\* cited by examiner

*Primary Examiner* — Yolanda L Wilson
(74) *Attorney, Agent, or Firm* — Staas & Halsey LLP

(57) ABSTRACT

A storage device, includes: a plurality of controller modules; a bus disposed among the plurality of controller modules, the bus including a plurality of transmission paths; a detector configured to detect an error in data communication through the bus; and a connection controller configured to carry out partial fallback processing of the bus if the number of the errors has exceeded a given number.

15 Claims, 7 Drawing Sheets

FIG. 3

| LINK SPEED \ NUMBER OF LANES | X 1 | X 2 | X 4 | X 8 | X 16 |
|---|---|---|---|---|---|
| 2.5GT/s (GEN1) | 0.16 | 0.33 | 0.65 | 0.3 | 2.6 |
| 5.0GT/s (GEN2) | 0.33 | 0.65 | 1.6 | 2.6 | 5.2 |
| 8.0GT/s (GEN3) | 0.65 | 0.3 | 2.6 | 5.2 | 10.4 |

UNIT: GB/s

STORAGE DEVICE, ERROR PROCESSING METHOD, AND COMMUNICATION SYSTEM

CROSS-REFERENCE TO RELATED APPLICATION

This application is based upon and claims the benefit of priority of the prior Japanese Patent Application No. 2012-272632, filed on Dec. 13, 2012, the entire contents of which are incorporated herein by reference.

FIELD

The embodiments discussed herein are related to storage devices, error processing methods, and communication systems.

BACKGROUND

Two storage devices each including a controller module (CM) are communicably interconnected through a Peripheral Component Interconnect Express (PCIe) bus. The PCIe bus is used with a plurality of transmission paths (lanes) being bundled together. A lane refers to a combination of a transmitting communication line and a receiving communication line from one CM to another CM.

Related techniques are discussed in Japanese Laid-open Patent Publication No. 2007-312095, Japanese Laid-open Patent Publication No. 2001-217896, and Japanese Laid-open Patent Publication No. 2009-93636.

SUMMARY

According to one aspect of the embodiments, a storage device, includes: a plurality of controller modules; a bus disposed among the plurality of controller modules, the bus including a plurality of transmission paths; a detector configured to detect an error in data communication through the bus; and a connection controller configured to carry out partial fallback processing of the bus if the number of the errors has exceeded a given number.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates an example of throughput performance;

DESCRIPTION OF EMBODIMENTS

In a storage device that includes CMs, when CM-to-CM communication becomes unavailable, one of the CMs is made to fall back. The state in which CM-to-CM communication is unavailable includes, for example, a state in which a fallback of a PCIe bus lane or reduction in the link speed has occurred or a state in which an uncorrectable error (UE) has occurred in a PCIe bus.

A PCIe error includes a correctable error (CE). A CE includes, for example, lane-to-lane skew and a phase locked loop (PLL) lock error. In lane-to-lane skew, when the same data is transmitted using a plurality of lanes, a delay may exceed a permissible range in some of the lanes, and the data may not be received correctly. In a PLL lock error, data may not be received correctly due to a deviation in frequency or in phase between a transmitter side and a receiver side.

Since a CE is automatically corrected by hardware and the like, CM-to-CM communication is retained even if a CE occurs. However, if, for example, a CE occurs frequently, system performance may be degraded due to an error correction by hardware and an error handler operation by software. Accordingly, when, for example, a CE occurs frequently in a PCIe bus between CMs, by isolating one of the CMs (fallback) and by masking through an interrupt so that the PCIe bus is not used, degradation in the system performance may be reduced.

For example, in a case where a normally functioning CM is isolated, even if a new CM is to be embedded, since a malfunctioning CM is left in the device, CM-to-CM communication may not be carried out. Furthermore, since the power supply of the device is turned off when the malfunctioning CM is to be replaced, business may be stopped.

Figure 1:
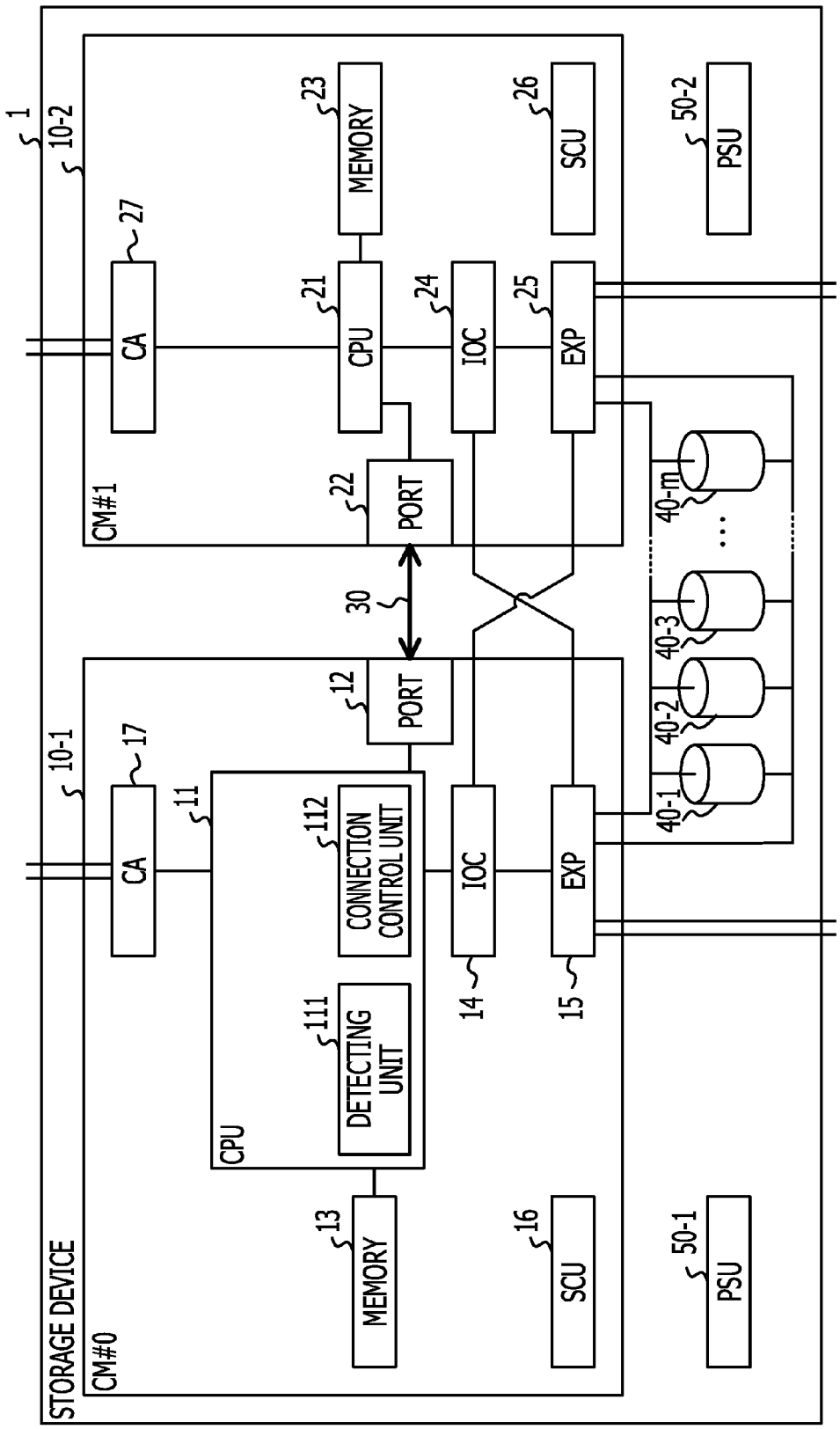
FIG. 1 illustrates an example of a functional configuration of a storage device.
Figure 2:
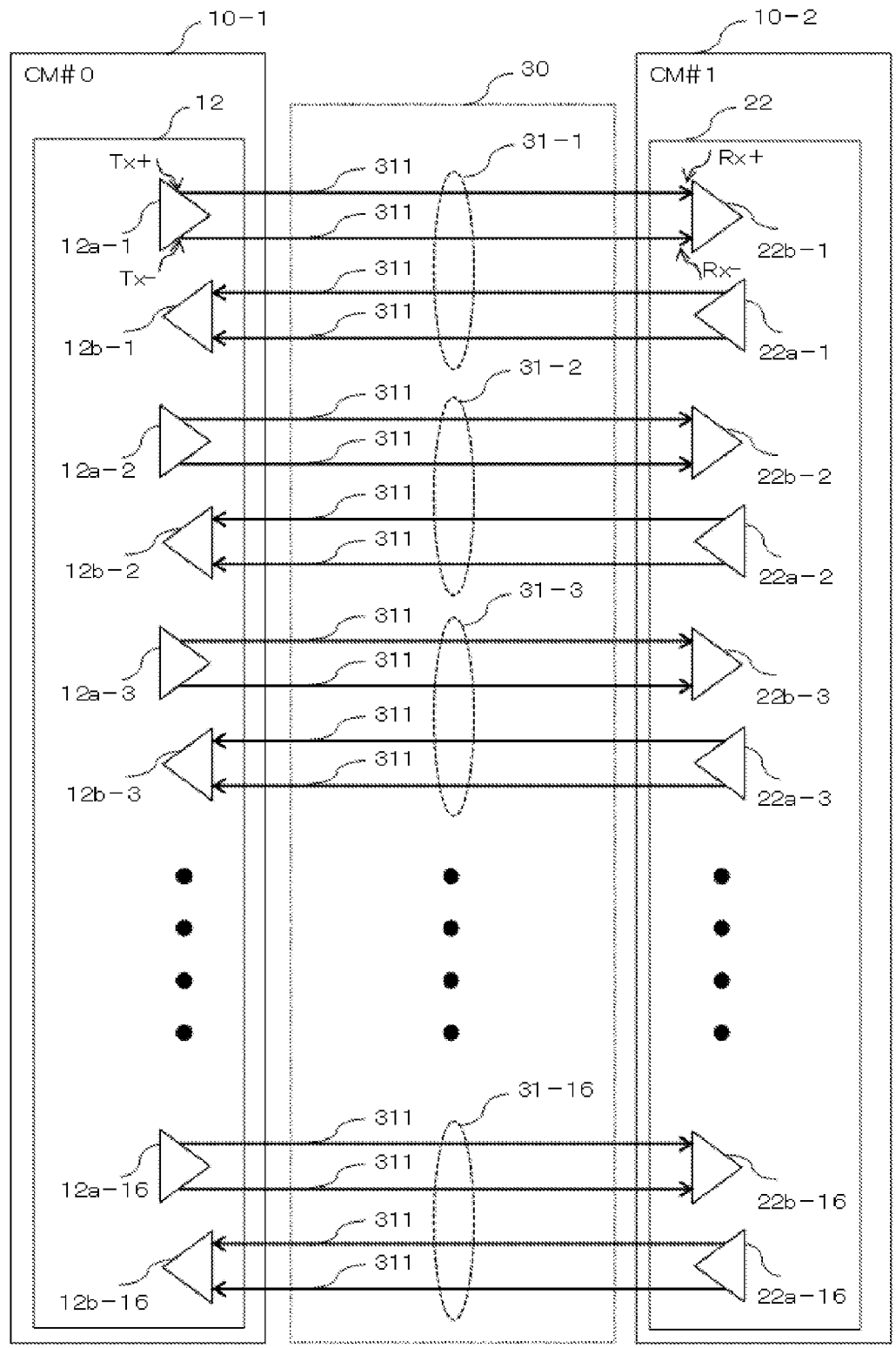
FIG. 2 illustrates an example of a PCIe bus.

Each of the drawings may include, in addition to the constituent elements illustrated therein, other functions and so on. FIG. 1 illustrates an example of a functional configuration of a storage device. FIG. 2 illustrates an example of a PCIe bus.

As illustrated in FIG. 1, a storage device 1 includes a plurality of, for example, two CMs 10-1 and 10-2, a PCIe bus 30, memory devices 40-1 to 40-$m$ ($m$ is an integer equal to or greater than 1), and more than one, for example, two power supply units (PSUs) 50-1 and 50-2. The storage device 1 may, for example, be a redundant arrays of independent disks (RAID) device and may manage the plurality of memory devices 40-1 to 40-$m$ as a single memory device.

The CM 10-1 may be referred to as a CM#0, and the CM 10-2 may be referred to as a CM#1. A specific CM may be indicated, for example, as "CM 10-1", "CM#0", "CM 10-2", or "CM#1", and an arbitrary CM may be indicated, for example, as "CM 10". The reference characters 40-1 to 40-$m$ may be used to designate a specific one of the plurality of memory devices, and the reference numeral 40 may be used to designate an arbitrary memory device.

The reference numeral 50-1 or 50-2 may be used to designate a specific one of the plurality of PSUs, and the reference numeral 50 may be used to designate an arbitrary PSU. The CM#0 and the CM#1 are communicably interconnected through the PCIe bus (bus) 30. The CM#0, the CM#1, and the PCIe bus 30 may be included in a communication system.

The memory device 40 may be a memory device that stores data such that the data can be read and written and may, for example, be a hard disk drive (HDD). In FIG. 1, the $m$ memory devices 40 are provided, and the memory devices 40 may be substantially the same as or similar to one another in terms of configuration. The PSU 50 may be a device that supplies electric power to the CM 10 and may, for example, be a known device. The PSU 50-1 supplies electric power to the CM#0, and the PSU 50-2 supplies electric power to the CM#1.

The CM 10 may be a controller module that carries out various controls and may, for example, carry out control based on a storage access request (access control signal) from a server device. The CM#0 includes a central processing unit (CPU; computer) 11, a port 12, a memory 13, an input/output controller (IOC) 14, a serial attached small computer system interface expander (EXP) 15, a system capacitor unit (SCU) 16, and a channel adapter (CA) 17.

The CPU 11, the port 12, the memory 13, the IOC 14, the EXP 15, and the CA 17 are communicably interconnected through, for example, a bus line. The port 12 is coupled to a port 22, which will be described later, of the CM#1 through the PCIe bus 30. For example, the CPU 11 carries out CM-to-CM communication with a CPU 21 of the CM#1 through the port 12, the PCIe bus 30, and the port 22.

The memory 13 may be a recording device that includes a read only memory (ROM) and a random access memory (RAM). An operating system (OS), a software program for error processing (error processing program), and various pieces of data for this program are written in the ROM of the memory 13. The software program in the memory 13 is loaded and executed by the CPU 11 as appropriate. The RAM of the memory 13 may be used as a primary recording memory or a working memory. The memory 13 may record a CE of the PCIe bus 30 detected by a detecting unit 111 of the CPU 11.

The IOC 14 transfers data between the memory device 40 and the CPU 11 and may, for example, be a dedicated chip. The EXP 15 may be a device that relays data between the CPU 11 and each memory device 40 and carries out data transfer on the basis of input/output (I/O) of a host device. For example, the CPU 11 accesses each memory device 40 included in the storage device 1 through the IOC 14 and the EXP 15. As illustrated in FIG. 1, the CPU 11 may access each memory device 40 included in the storage device 1 through the IOC 14 and an EXP 25 of the CM#1. The EXP 15 may, for example, be communicably coupled to a drive enclosure (DE).

The SCU 16 is used as a temporary power supply source in a case where electric power supply to the CM#0 is shut off due to a power failure or the like and may, for example, be an electric double layer capacitor or the like. The CA 17 may be an interface controller that communicably connects a host device with the CM#0. The CA 17 receives data transmitted from the host device and the CPU 11 and temporarily stores the data in the memory 13. Then, the CA 17 passes the data to the CPU 11 and also transmits the data received from the CPU 11 to the host device. For example, the CA 17 may have a function of controlling input and output (I/O) of data from and to an external device such as the host device.

The CPU 11 may be a processing device that carries out various controls and operations and executes the OS and the program stored in the memory 13 to implement various functions. As illustrated in FIG. 1, the CPU 11 may, for example, function as the detecting unit 111 and a connection control unit 112. The CPU 11 of the CM#0 may function as the detecting unit 111 and the connection control unit 112 by executing the error processing program.

The program (error processing program) for implementing the functions as the detecting unit 111 and the connection control unit 112 may be provided in the form of a program recorded in a computer-readable recording medium such as a flexible disk, a CD (CD-ROM, CD-R, CD-RW, and so on), a DVD (DVD-ROM, DVD-RAM, DVD-R, DVD+R, DVD-RW, DVD+RW, HD DVD, and so on), a Blu-ray Disc, a magnetic disk, an optical disk, and a magneto-optical disk. The computer reads the program from the recording medium, transfers the program to an internal recording device or an external recording device, and stores the program therein for use. For example, the program may be provided to the computer from a recording device (recording medium) such as a magnetic disk, an optical disk, and a magneto-optical disk in which the program is recorded through a communication path.

When implementing the functions as the detecting unit 111 and the connection control unit 112, the program stored in the internal recording device such as the memory 13 is executed by a microprocessor such as the CPU 11 of the computer. The computer may read and execute the program recorded in the recording medium. The computer may include hardware and an OS and may be hardware that operates under the control of the OS. In a case where an OS is unnecessary and hardware is operated solely through an application program, the hardware itself may correspond to the computer. The hardware may include at least a microprocessor such as a CPU and a function for reading a computer program recorded in a recording medium. For example, the CM#0 and the CM#1 may have the functions of a computer.

The detecting unit 111 detects a CE during data communication through the PCIe bus 30. The detecting unit 111 records information on a detected CE in the memory 13. An existing technique may be used to detect a CE by the detecting unit 111. If the number of CEs detected by the detecting unit 111 has exceeded a given number, the connection control unit 112 may carry out partial fallback processing of the PCIe bus 30. For example, the connection control unit 112 refers to the memory 13 to determine whether or not the number of recorded CEs has exceeded a threshold value. If the number of recorded CEs has exceeded the threshold value, the connection control unit 112 may carry out the partial fallback processing of the PCIe bus 30.

The CM#1 includes the CPU 21, the port 22, a memory 23, an IOC 24, the EXP 25, an SCU 26, and a CA 27. The CPU 21, the port 22, the memory 23, the IOC 24, the EXP 25, the SCU 26, and the CA 27 may be substantially the same as or similar to, respectively, the CPU 11, the port 12, the memory 13, the IOC 14, the EXP 15, the SCU 16, and the CA 17 of the CM#0 described above in function and configuration.

One of the CPU 11 and the CPU 21 may not have a function of the detecting unit 111 and the connection control unit 112. One of the CPU 11 and the CPU 21 which has the function of the detecting unit 111 and the connection control unit 112 may carry out the error processing of the storage device 1. For example, one CM 10 that carries out the error processing may be set as a master CM, and the other CM 10 may be set as a slave CM.

In FIG. 1, the CM#0 may be the master CM, and the CM#1 may be the slave CM. As illustrated in FIG. 2, the port 12 and the port 22 are communicably interconnected through a plurality of, for example, 16 lanes 31-1 to 31-16. For example, the PCIe bus 30 includes the plurality of lanes (transmission paths) 31-1 to 31-16. The reference numerals 31-1 to 31-16 are used to designate a specific one of the plurality of lanes, and the reference numeral 31 is used to designate an arbitrary lane.

In FIG. 2, the ports 12 and 22 are illustrated as functions and configurations included in the CM 10, and other functions and configurations may be omitted. The port 12 includes 16 transmitters 12a-1 to 12a-16 and 16 receivers 12b-1 to 12b-16 in accordance with the number of the lanes. The port 22 includes 16 transmitters 22a-1 to 22a-16 and 16 receivers 22b-1 to 22b-16 in accordance with the number of the lanes.

The reference characters 12a-1 to 12a-16 or 22a-1 to 22a-16 are used to designate a specific one of the plurality of transmitters, and the reference character 12a or 22a is used to designate an arbitrary transmitter. The reference characters 12b-1 to 12b-16 or 22b-1 to 22b-16 are used to designate a specific one of the plurality of receivers, and the reference character 12b or 22b is used to designate an arbitrary receiver.

As illustrated in FIG. 2, in each lane 31, a transmitter 12a and a receiver 22b are interconnected through communication lines 311 such that data can be transferred from the transmitter 12a to the receiver 22b, and a transmitter 22a and a receiver 12b are interconnected through communication lines 311 such that data can be transferred from the transmitter 22a to the receiver 12b. Each of the transmitters 12a and 22a includes two output pins Tx+ and Tx−. Each of the receivers 12b and 22b includes two input pins Rx+ and Rx−. For example, in each lane 31, the output pin Tx+ of the transmitter 12a is communicably connected to the input pin Rx+ of the receiver 22b through the communication 311, and the output pin Tx− of the transmitter 12a is communicably connected to the input pin Rx− of the receiver 22b through the communication line 311. For example, in each lane 31, the output pin Tx+ of the transmitter 22a is communicably connected to the input pin Rx+ of the receiver 12b through the communication 311, and the output pin Tx− of the transmitter 22a is communicably connected to the input pin Rx− of the receiver 12b through the communication line 311.

In this manner, in the lane 31, the transmitters 12a and 22a and the receivers 12b and 22b are interconnected through the four communication lines 311. The ports 12 and 22 may include, in addition to the output pins Tx+ and Tx− and the input pins Rx+ and Rx−, various other pins. The number of the lanes 31 is not limited to 16 and may be provided in any number that corresponds to the number of the transmitters 12a and 22a and the receivers 12b and 22b included in each port 12 and each port 22. The number of the communication lines 311 included in the lane 31 may also be modified as appropriate.

FIG. 3 illustrates an example of throughput performance. The throughput performance illustrated in FIG. 3 may be throughput performance that is based on the number of the lanes in the PCIe bus and the link speed thereof. The PCIe standards include, for example, PCIe 1.1 (Gen 1), PCIe 2.0 (Gen 2), and PCIe 3.0 (Gen 3). Each of the standards has a distinct link speed, and the link speeds of Gen 1, Gen 2, and Gen 3 are 2.5 GT/s, 5.0 GT/s, and 8.0 GT/s, respectively, and vary stepwise.

In PCIe, the number of lanes to be used for communication may be set as desired. For example, as illustrated in FIG. 3, the number of the lanes may be set to one (×1), two (×2), four (×4), eight (×8), or sixteen (×16). In FIG. 2, since the number of the lanes in the PCIe bus 30 is ×16, a throughput value of the PCIe bus 30 may, for example, be 10.4 GB/s in Gen 3, 5.2 GB/s in Gen 2, and 2.6 GB/s in Gen 1, as illustrated in FIG. 3. If, for example, the number of the lanes is fixed, as the link speed decreases in the order of Gen 3, Gen 2, and Gen 1, the throughput value decreases by half each time.

Lane-to-lane skew and a PLL lock error, which may cause a CE to occur, may be resolved by reducing the link speed of the PCIe bus 30. The connection control unit 112 may control the link speed of the PCIe bus 30. For example, if the number of CEs detected by the detecting unit 111 has exceeded a given number, the connection control unit 112 carries out forced link speed reduction processing, in which the link speed of the PCIe bus 30 is reduced from Gen 3 to Gen 2 or from Gen 2 to Gen 1. The connection control unit 112 may, for example, carry out the forced link speed reduction processing by overwriting the value of Link Control 2 Register within PCI Express Capability Structure that is defined by PCI Express Base Specification Revision 3.0.

The connection control unit 112 may control the number of lanes of the PCIe bus 30. For example, if the link speed is Gen 1 and the number of lanes is ×16, as illustrated in FIG. 3, the throughput value may, for example, be 2.6 GB/s. If the number of lanes is sequentially reduced from this state by half each time, the throughput value of the PCIe bus 30 decreases, for example, stepwise from 1.3 GB/s at >8, 0.65 GB/s at ×4, 0.33 GB/s at ×2, to 0.16 GB/s at ×1. For example, if the link speed is fixed, as the number of lanes is sequentially decreased by half each time from ×16, ×8, ×4, ×2, to ×1, the throughput value also decreases sequentially by half each time.

If the number of CEs detected by the detecting unit 111 has exceeded a given number and the link speed is Gen 1, the connection control unit 112 may carry out forced lane fallback processing, in which the number of lanes of the PCIe bus 30 is reduced from ×16 to ×8, from ×8 to ×4, from ×4 to ×2, or from ×2 to ×1. The connection control unit 112 reduces the number of lanes to be used to operate the system by isolating part of the lanes 31 of the PCIe bus 30 from the system. Isolation of the lanes 31 may, for example, be carried out through a known method.

Figure 4:
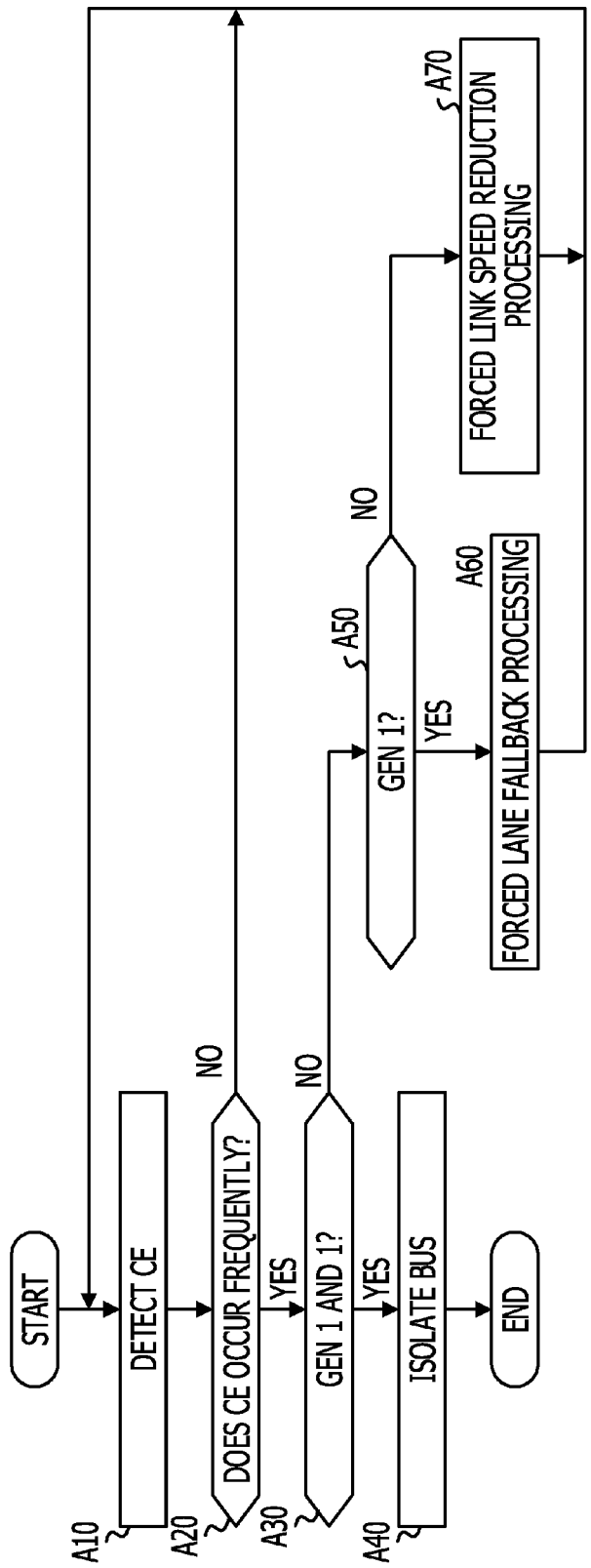
FIG. 4 illustrates an example of a partial fallback processing.

Processing in which the forced link speed reduction processing and the forced lane fallback processing are combined may be referred to as partial fallback processing. For example, the connection control unit 112 carries out the partial fallback processing of the PCIe bus 30. In the partial fallback processing, the connection control unit 112 carries out the forced link speed reduction processing prior to the forced lane fallback processing. FIG. 4 illustrates an example of a partial fallback processing. The partial fallback processing illustrated in FIG. 4 may be the partial fallback processing of the PCIe bus 30 of the storage device 1.

If a CE occurs in the storage device 1, the detecting unit 111 records information on the detected CE in the memory 13 (operation A10). The connection control unit 112 refers to the memory 13 to determine whether or not the number of CEs detected by the detecting unit 111 has exceeded a given number, for example, whether or not a CE occurs frequently (operation A20). If the number of CEs detected by the detecting unit 111 has exceeded the given number (see YES route of the operation A20), the connection control unit 112 determines whether or not the link speed of the PCIe bus 30 is Gen 1 and the number of the lanes is ×1 (operation A30).

If the link speed of the PCIe bus 30 is Gen 1 and the number of the lanes is ×1 (see YES route of the operation A30), the connection control unit 112 is no longer able to carry out the partial fallback processing of the PCIe bus 30, and thus the connection control unit 112 isolates the PCIe bus 30 (operation A40) and causes the slave CM#1 to fall back. The partial fallback processing of the PCIe bus 30 ends.

If the link speed of the PCIe bus 30 is not Gen 1 or the number of the lanes is not ×1 (see NO route of the operation A30), the connection control unit 112 determines whether or not the link speed of the PCIe bus 30 is Gen 1 (operation A50). If the link speed of the PCIe bus 30 is Gen 1 (see YES route of the operation A50), the connection control unit 112 carries out the forced lane fallback processing (operation A60), and the processing returns to the operation A10. For example, the connection control unit 112 isolates part of the lanes 31 of the PCIe bus 30 and reduces the number of the lanes by half each time.

If the link speed of the PCIe bus 30 is not Gen 1 (see NO route of the operation A50), the connection control unit 112 carries out the forced link speed reduction processing (operation A70), and the processing returns to the operation A10.

For example, the connection control unit 112 reduces the link speed of the PCIe bus 30 by one step from Gen 3 to Gen 2 or from Gen 2 to Gen 1.

If the number of CEs detected by the detecting unit 111 has not exceeded the given number (see NO route of the operation A20), the connection control unit 112 does not carry out the partial fallback processing of the PCIe bus 30, and the processing returns to the operation A10. In the storage device 1 illustrated in FIG. 1, since the connection control unit 112 carries out the partial fallback processing of the PCIe bus 30, a CE is resolved efficiently, and thus a fallback of the CM10 may be avoided.

Since the connection control unit 112 carries out the forced link speed reduction processing, an error that has occurred may be resolved without isolating the PCIe bus. Since the connection control unit 112 carries out the forced link speed reduction processing, lane-to-lane skew in CM-to-CM communication may be resolved. Since the connection control unit 112 carries out the forced link speed reduction processing, a PLL lock error in CM-to-CM communication may be resolved.

Since the connection control unit 112 carries out the forced lane fallback processing, an error that has occurred may be resolved without isolating the PCIe bus.

Figure 5:
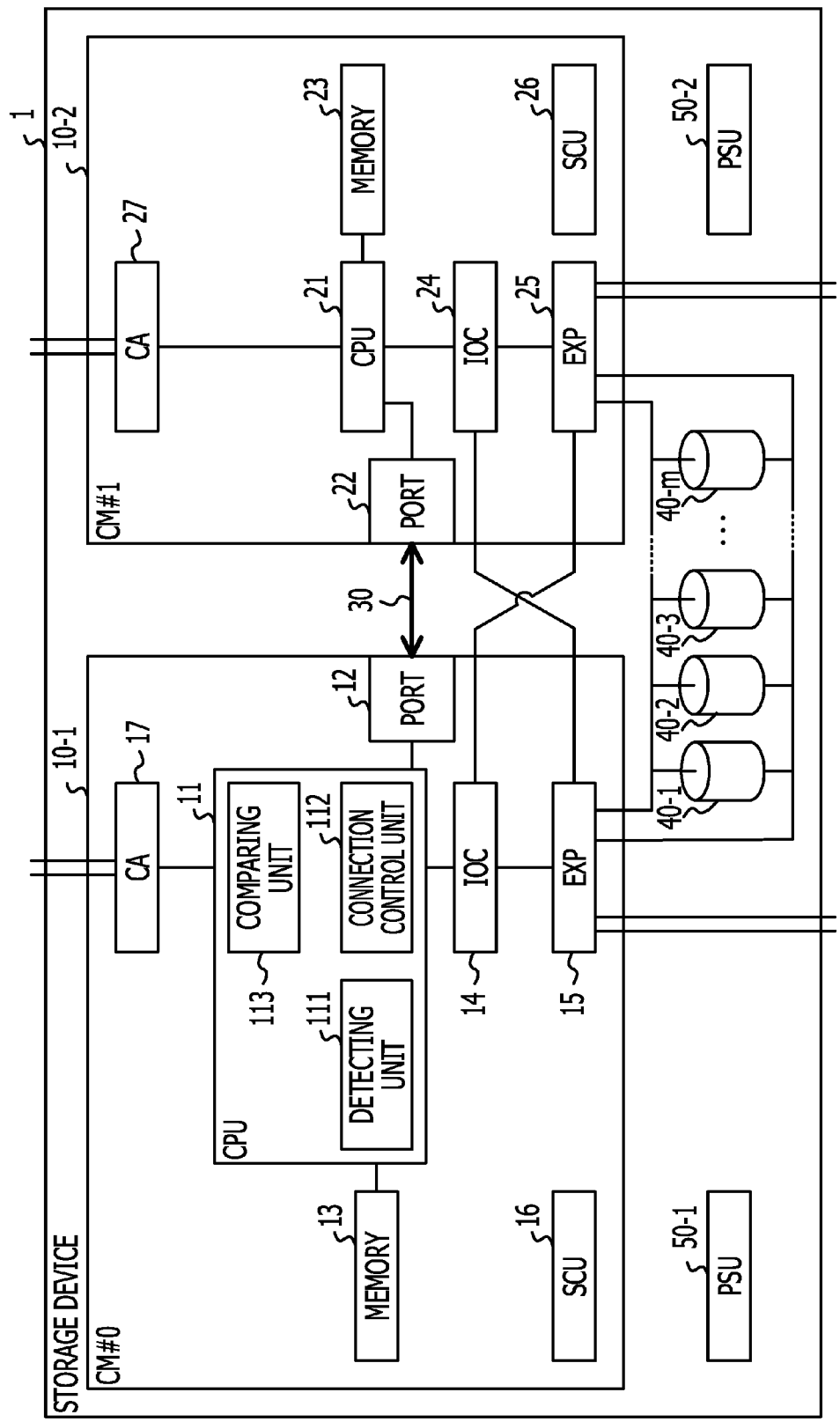
FIG. 5 illustrates an example of a functional configuration of a storage device.

FIG. 5 illustrates an example of a function and a configuration of a storage device. In FIG. 5, elements having configurations and functions that are substantially the same as or similar to those of the aforementioned elements are given the same reference characters, and description thereof may be omitted or reduced. A storage device 1 illustrated in FIG. 5 includes, in addition to the functions and the configurations of the storage device 1 illustrated in FIG. 1, a comparing unit 113 included in the CPU 11.

In order to reduce a reduction in the performance of the storage device 1 caused by the reduction in the number of lanes or in the link speed of the PCIe bus 30, a determination is made as to whether a suitable performance is retained after the partial fallback processing of the PCIe bus 30. The comparing unit 113 compares a communication performance value between the CMs 10 after the partial fallback with a performance reference value for the storage device 1. The communication performance value may be a throughput value of the PCIe bus 30. The performance reference value may be a throughput value of a bus between the CPU 11 and the memory 13 or of all the memory devices 40 and may be recorded in advance in the memory 13 as a threshold value.

For example, if the link speed is Gen 1 and the number of the lanes is ×16, as illustrated in FIG. 3, the throughput value of the PCIe bus 30 may be 2.6 GB/s. As the connection control unit 112 carries out the partial fallback processing of the PCIe bus 30, the number of the lanes decreases from ×16 to ×8, and the throughput value decreases to 1.3 GB/s. The comparing unit 113 compares the communication performance value of 1.3 GB/s with the performance reference value recorded in advance in the memory 13.

For example, an operation of the CPU 11 when there is a write request from a host device to the memory device 40 includes a write-through operation and a write-back operation. In the write-through operation, when there is a write request from the host device to the memory device 40, the CPU 11 first writes information in the memory device 40 and then returns the result to the host device.

In the write-back operation, when there is a write request from the host device to the memory device 40, the CPU 11 once writes information in the memory device 13 and, at that point, returns the result to the host device. Thereafter, the CPU 11 sequentially writes in the memory device 40 the information that has been recorded in the memory 13. In the write-through operation and the write-back operation, an element that affects the performance of the storage device differs. In the write-through operation, for example, a throughput value of all the memory devices 40 obtained by multiplying the throughput value of a single memory device 40 by the number m of the memory devices 40 affects the performance of the storage device. In the write-back operation, for example, a throughput value of a bus between the CPU 11 and the memory 13 (hereinafter, referred to as a neck bus) affects the performance of the storage device.

While the CPU 11 carries out the write-through operation, the comparing unit 113 compares the throughput value of the PCIe bus 30 after the partial fallback processing with the throughput value of all the memory devices 40. If the throughput value of the PCIe bus 30 after the partial fallback processing is higher, the comparing unit 113 causes the connection control unit 112 to carry out the partial fallback processing of the PCIe bus 30. If the throughput value of the PCIe bus 30 after the partial fallback processing is lower, since the performance suitable as the storage device is not retained, the comparing unit 113 causes the connection control unit 112 to isolate the PCIe bus 30.

While the CPU 11 carries out the write-back operation, the comparing unit 113 compares the throughput value of the PCIe bus 30 after the partial fallback processing with the throughput value of the neck bus. If the throughput value of the PCIe bus 30 after the partial fallback processing is higher, the comparing unit 113 causes the connection control unit 112 to carry out the partial fallback processing of the PCIe bus 30. If the throughput value of the PCIe bus 30 after the partial fallback processing is lower, since performance suitable as the storage device is not retained, the comparing unit 113 causes the connection control unit 112 to isolate the PCIe bus 30.

Figure 6:
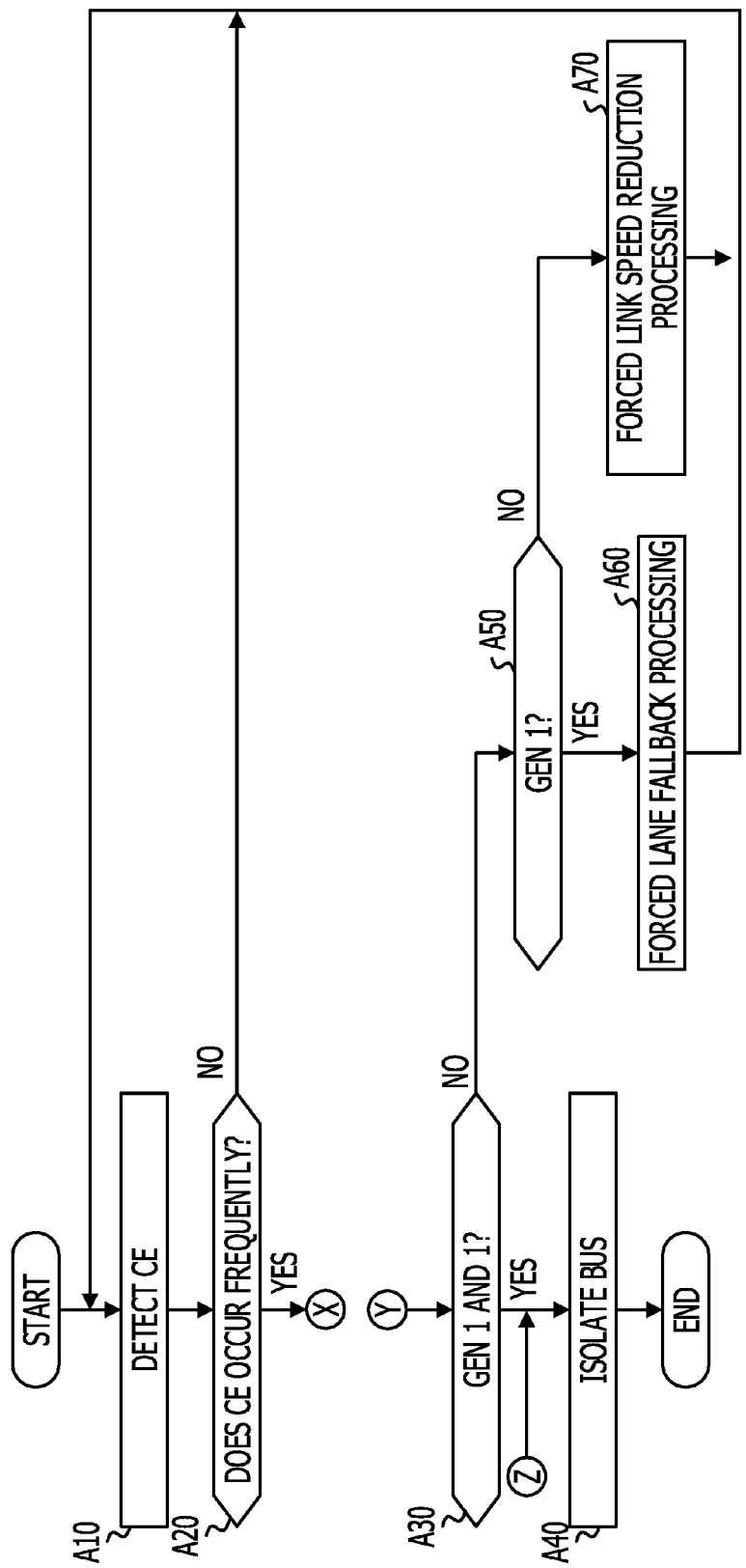
FIG. 6 illustrates an example of a partial fallback processing of a PCIe bus.
Figure 7:
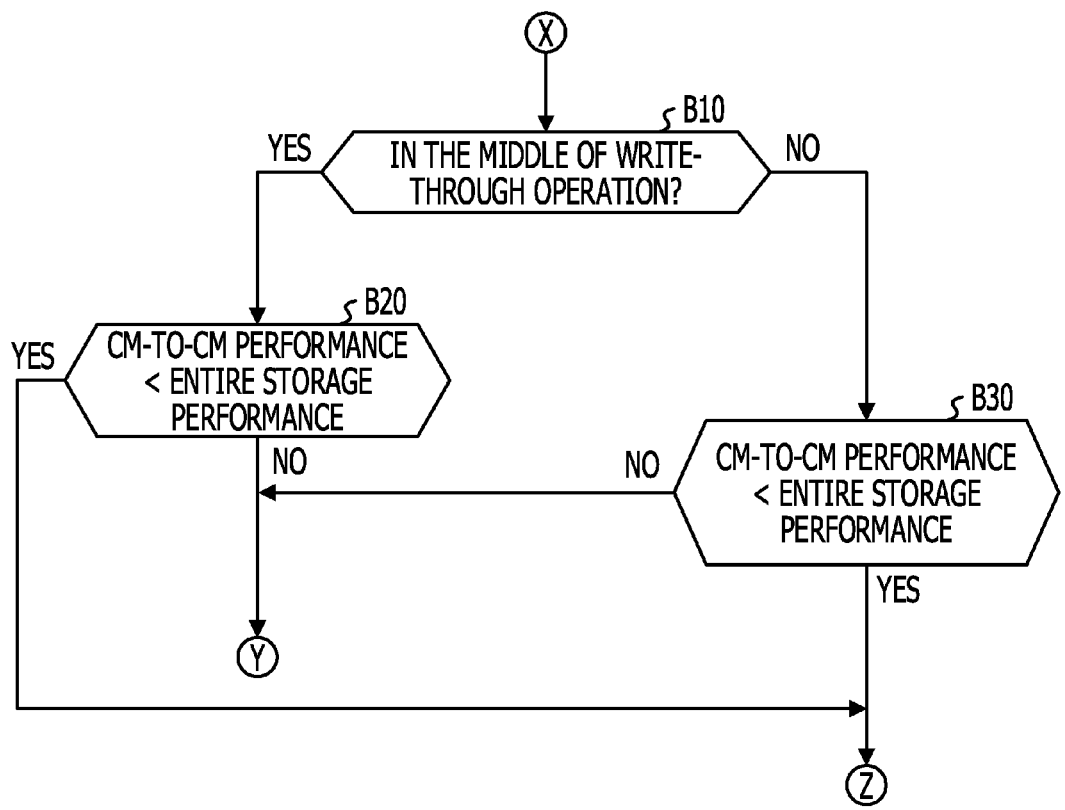
FIG. 7 illustrates the example of a partial fallback processing of a PCIe bus.

FIGS. 6 and 7 illustrate an example of a partial fallback processing of a PCIe bus. The PCIe bus 30 of the storage device 1 illustrated in FIG. 5 may carry out the partial fallback processing illustrated in FIGS. 6 and 7. In FIGS. 6 and 7, operations that are substantially the same as or similar to the operations illustrated in FIG. 4 in function are given the same reference characters and description thereof may be omitted or reduced.

If the number of CEs detected by the detecting unit 111 has exceeded a given number (see YES route of the operation A20 of FIG. 6), the comparing unit 113 determines whether or not the CPU 11 is in the middle of the write-through operation (operation B10 of FIG. 7). If the CPU 11 is in the middle of the write-through operation (see YES route of the operation B10 of FIG. 7), the comparing unit 113 makes a comparison to determine whether the throughput value between the CMs 10 after the partial fallback processing is lower than the throughput value of all the memory devices 40 (operation B20 of FIG. 7).

If the throughput value between the CMs 10 after the partial fallback processing is lower than the throughput value of all the memory devices 40 (see YES route of the operation B20 of FIG. 7), the processing moves to the operation A40 of FIG. 6. If the throughput value between the CMs 10 after the partial fallback processing is not lower than the throughput value of all the memory devices 40 (see NO route of the operation B20 of FIG. 7), the processing moves to the operation A30 of FIG. 6.

If the CPU 11 is not in the middle of the write-through operation (see NO route of the operation B10 of FIG. 7), the comparing unit 113 makes a comparison to determine whether the throughput value between the CMs 10 after the partial fallback processing is lower than the throughput value of the neck bus (operation B30 of FIG. 7). If the throughput value between the CMs 10 after the partial fallback processing is lower than the throughput value of the neck bus (see YES route of the operation B30 of FIG. 7), the processing moves to the operation A40 of FIG. 6.

If the throughput value between the CMs 10 after the partial fallback processing is not lower than the throughput value of the neck bus (see NO route of the operation B30 of FIG. 7), the processing moves to the operation A30 of FIG. 6. The storage device 1 illustrated in FIG. 5 may have effects that are substantially the same as or similar to those of the storage device illustrated in FIG. 1 and may also have the following effects.

As the comparing unit 113 determines whether or not performance suitable for the storage device can be retained after the partial fallback processing of the PCIe bus 30, reduction in the performance of the storage device caused by the reduction in the link speed and in the number of the lanes of the PCIe bus 30 may be reduced. As the comparing unit 113 changes a performance value to be compared with the throughput value between the CMs depending on whether the CPU is in the middle of the write-through operation or in the middle of the write-back operation, an appropriate determination is made in accordance with the operation mode of the storage device 1, and thus the system reliability may improve.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A storage device, comprising:
a plurality of controller modules;
a bus disposed among the plurality of controller modules, the bus including a plurality of transmission paths;
a detector configured to detect one or more errors in data communication through the bus; and
a connection controller configured to carry out partial fallback processing of the bus if when a number of the one or more errors has exceeded a given number,
wherein the connection controller reduces a communication speed in the bus as the partial fallback processing.

2. The storage device according to claim 1, wherein the connection controller reduces the communication speed stepwise.

3. The storage device according to claim 1, wherein the connection controller causes at least of a part of the plurality of transmission paths to fall back as the partial fallback processing.

4. The storage device according to claim 3, wherein the connection controller, after reducing the communication speed in the bus to a given speed, causes the part of the transmission paths to fall back.

5. The storage device according to claim 1, further comprising:

a comparator configured to compare a communication performance value among the controller modules with a performance reference value in the storage device,
wherein the connection controller carries out the partial fallback processing of the bus when the communication performance value exceeds the performance reference value.

6. An error processing method for a storage device, comprising:
detecting one or more errors in data communication through a bus that is disposed among a plurality of controller modules and that includes a plurality of transmission paths;
carrying out partial fallback processing of the bus when a number of the one or more errors has exceeded a given number; and
reducing a communication speed in the bus as the partial fallback processing.

7. The error processing method according to claim 6, wherein the communication speed is reduced stepwise.

8. The error processing method according to claim 6, further comprising causing at least a part of the plurality of transmission paths to fall back as the partial fallback processing.

9. The error processing method according to claim 8, wherein the part of the transmission paths are caused to fall back after the communication speed in the bus is reduced to a given speed.

10. The error processing method according to claim 6, further comprising:
comparing a communication performance value among the controller modules with a performance reference value in the storage device,
wherein the partial fallback processing of the bus is carried out when the communication performance value exceeds the performance reference value.

11. A communication system, comprising:
a plurality of controller modules;
a bus disposed among the plurality of controller modules, the bus including a plurality of transmission paths;
a detector configured to detect one or more errors in data communication through the bus; and
a connection control unit configured to carry out partial fallback processing of the bus when a number of the one or more errors has exceeded a given number,
wherein a communication speed in the bus is reduced as the partial fallback processing.

12. The communication system according to claim 11, wherein the communication speed is reduced stepwise.

13. The communication system according to claim 11, wherein at least a part of the plurality of transmission paths is caused to fall back as the partial fallback processing.

14. The communication system according to claim 13, wherein the part of the transmission paths are caused to fall back after the communication speed in the bus is reduced to a given speed.

15. The communication system according to claim 11, wherein a communication performance value among the controller modules is compared with a performance reference value in the storage device, and
wherein the partial fallback processing of the bus is carried out when the communication performance value exceeds the performance reference value.

* * * * *